Aug. 10, 1965   J. KORN   3,200,238
RESISTOR CIRCUIT
Filed May 10, 1962   2 Sheets-Sheet 1

INVENTOR
Joel Korn
BY George K Spencer
ATTORNEY

# United States Patent Office 3,200,238
Patented Aug. 10, 1965

3,200,238
RESISTOR CIRCUIT
Joel Korn, Backnang, Wurttemberg, Germany, assignor to Telefunken Patentverwertungs-G.m.b.H., Ulm (Danube), Germany
Filed May 10, 1962, Ser. No. 193,792
Claims priority, application Germany, May 10, 1961, T 20,142
8 Claims. (Cl. 219—504)

The present invention relates generally to the thermistor art, and, more particularly, to a device for reducing the time constant of thermistors.

In the past, indirectly heated thermistors have been used for regulating purposes. When used for each purposes, and particularly when used for the level regulation in multichannel carrier-frequency communication systems, it has already been proposed (German patent application Serial No. T 19,777 VIIIa/21a2) to vary the heating current in step-wise manner by means of an electronic digital setting device. In this case, the heating current steps are preferably made equal to one another, i.e., on each regulating pulse which reaches the setting device, the heating current I varies by an equal amount $\Delta I$ and then remains unaltered until a new regulating pulse occurs. If the thermistor is to be heated, the heating current is increased in setp-wise fashion by $\Delta I$ each time. If the thermistor is to be cooled, then the heating current is reduced in a step-wise fashion by $\Delta I$ each time.

As a result of the high time constant of the thermistor, which amounts to several seconds, the thermistor resistance only varies slowly in accordance with an e-function when a sudden variation in the heating current appears. Thus, the regulating process occurs very slowly and because of this a brief summation of errors may be caused when a plurality of regulators are connected in series in a relatively long transmission section. In addition, the cooling time constant and the heating time constant of the thermistor are not equal but, the heating takes place more quickly than the cooling.

With these defects of the prior art in mind, it is a main object of the present invention to provide a circuit device which overcomes the disadvantages of the prior art.

Another object of the invention is to provide a circuit device of the character described which reduces the time constant of thermistors and other temperature-responsive resistors.

These objects and other ancillary thereto are accomplished according to preferred embodiments of the invention wherein a circuit arrangement is provided for reducing the time constant of the thermistors and particularly indirectly heated resistors wherein the heating current is regulated in a step-wise fashion. This regulation may be provided by an electronic digital setting device. This arrangement is particularly well suited for use for the level control in multichannel carrier-frequency communication systems.

According to the present invention, two time-controlled switches are provided which are actuated, for example by the control circuit of the setting device simultaneously with the latter, in such a manner that, upon a step-wise increased in the heating current, one switch causes a substantial additional increase in the heating current for a short time, and upon a step-wise reduction in the heating current, the other switch causes a substantial additional reduction in the heating current for a short time. The duration of the additional current pulses may be determined either externally by the control circuit or internally by suitable design and choice of values of the components of the switch arrangement.

Additional objects and advantages of the present invention will become apparent upon consideration of the following description when taken in conjunction with the accompanying drawings in which.

Figure 1:
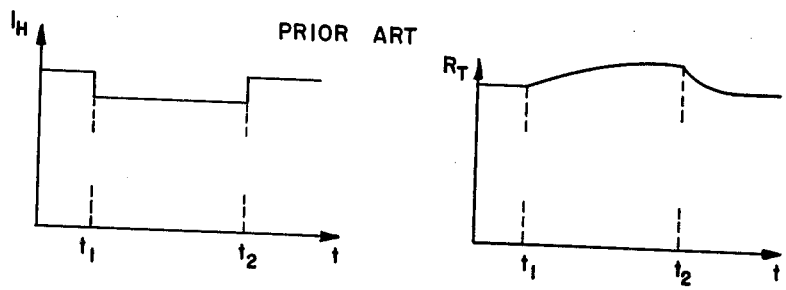
FIGURE 1 is a graphical view illustrating two curves of a prior art device, the curves being thermistor heating current with respect to time and thermistor resistance with respect to time, but correlated with the heating current.

With more particular reference to the drawing, FIGURE 1 illustrates the thermistor heating current $I_H$ as a function of time. This current is decreased and increased, respectively, by one step at the time $t_1$ and $t_2$, respectively. The corresponding variations of the thermistor resistance $R_T$ with respect to time is also indicated. This indicates the operation of thermistor devices of the prior art.

Figure 2:
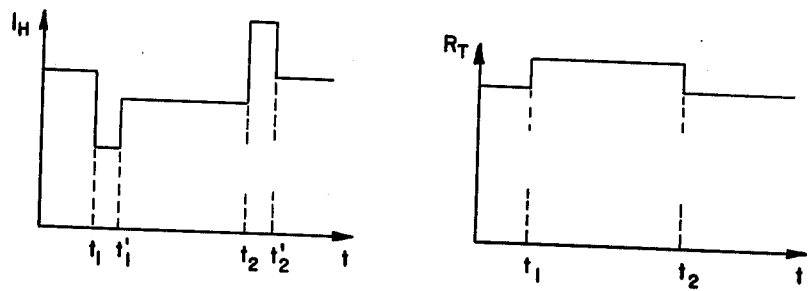
FIGURE 2 is a graphical view illustrating two curves plotted similarly as those of FIGURE 1 for the device of the present invention.

FIGURE 2 shows the heating current and the thermistor resistance (both as a function of time) when a circuit arrangement according to the present invention is used. As can be seen, upon the arrival of the regulating pulse which is intended to cause cooling of the thermistor, the current $I_H$ at the moment $t_1$ is reduced to a greater extent than the amount corresponding to the normal current step as indicated in FIGURE 1, and the current is held at this value until moment $t'_1$. Within this period of time, which is determined by the control of the switch for the additional negative current pulses, the thermistor is cooled rapidly. At the moment $t'_1$, the switch changes its position, the additional negative current pulse is removed, and the current $I_H$ rises to the normal value corresponding to the normal or desired current step.

Upon the arrival of the regulating pulse which is intended to cause heating of the thermistor, the other switch becomes effective at the moment $t_2$, and for a short time delivers a large additional positive current pulse which rapidly heats the thermistor. After a certain period of time, which is determined by the control of this second switch, the additional positive current pulse is switched off at the moment $t'_2$ so that the current $I_H$ drops to its value corresponding to the normal or desired current step. In this case, the resistance $R_T$ follows the course illustrated and has sharply pronounced substantially rectangular steps. The amplitude of the additional pulse depends upon the desired decrease of the time constant, while the duration of the pulse should be such that the additional current ceases just as the thermistor resistance corresponding to the normal or desired current step is reached.

Figure 3:
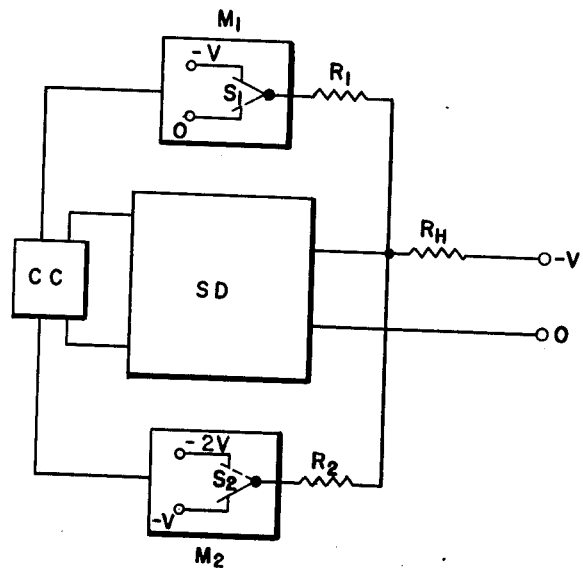
FIGURE 3 is a circuit diagram of one embodiment of the instant invention.

FIGURE 3 shows an embodiment of a circuit arrangement according to the instant invention. The electronic setting device SD which is electronically controlled by a control circuit CC in accordance with the necessary regulating steps, delivers an impressed current, which is variable in step-wise manner, from a D.C. voltage source $-V$, 0 to the heating resistor $R_H$ of the thermistor. The two switches $S_1$, $S_2$, deliver a strong additional current pulse through the heating resistor $R_H$ for a short time, and are in the form of monostable multivibrators $M_1$ and $M_2$, respectively, and are each equipped, for example, with two transistors. The voltage $-V$, 0 is applied to the multivibrator $M_1$ in such a manner that the collector voltage of the transistors can assume the value $-V$ or 0. The voltage $-2V$, $-V$ is applied to the multivibrator $M_2$ in such a manner that the collector voltage of the transistors can assume the value −2V, or −V. The multivibrators are indicated in the form of change-over switches. In the normal or rest position, the two change-over switches are in the position −V and do not deliver any current to the heating resistor $R_H$.

If the heating current is to be increased by one step after a regulating pulse had been received, the multivibrator $M_1$ is actuated simultaneously with the setting device SD from the control circuit CC. The switch $S_1$ is brought into position 0 and, for the pulse duration of the multivibrator $M_1$, an additional positive current flows through a resistor $R_1$ and the heating resistor $R_H$. The value of this current is considerably greater than the height of a normal or desired current step $\Delta I$. Thus, an excess current flows through the heating resistor for a short time.

If the heating current is to be reduced by one step following a regulating pulse, then the multivibrator $M_2$ is correspondingly actuated simultaneously with the setting device SD from the control circuit CC. The switch $S_2$ is brought into the position −2V and, for the pulse duration of the multivibrator $M_2$, an additional negative current flows through resistor $R_2$ and the heating resistor $R_H$. As a result, the current in the heating resistor $R_H$ is greatly reduced for a short period of time. In this example, the pulse duration of the time-controlled switch $S_1$ or $S_2$, respectively, is determined by the pulse duration of the multivibrators $M_1$ or $M_2$, respectively.

The time-controlled switches $S_1$, $S_2$ may be constructed not only as monostable multivibrators but also as time-controlled bistable multivibrators, as blocking oscillators, or as relay circuits. It is also possible to omit one of the swicthes, for example in order to shorten only the time constant for the cooling or only the time constant for the heating of the thermistor.

The multivibrators $M_1$ and $M_2$ may be equipped with transistors of the same type of conductivity, for example PNP transistors. In this case, as shown in FIGURE 3, the same operating voltage (−V, 0) is applied to the multivibrator $M_1$ for positive current pulses as to the setting device SD. An additional operating voltage (−2V, −V), which is connected in series with the first operating voltage, is applied to the multivibrator $M_2$ for negative current pulses in such a manner that both multivibrators act like change-over switches which in each case connect the non-common pole (0, −2V) of their sources of operating voltage to one terminal of the heating resistor $R_H$ through the series resistors $R_1$, $R_2$, while the other terminal of the heating resistor is connected to the common pole (−V) of the two operating voltages.

On the other hand, if the multivibrators $M_1$ and $M_2$ are equipped with transistors of different types of conductivity, for example $M_1$ with PNP transistors and $M_2$ with NPN transistors, then the multivibrator $M_1$ for positive current pulses receives the same operating voltage (−V, 0) as the setting device SD and the multivibrator $M_2$ for negative current pulses receives an additional operating voltage (0, +V) which is connected in series with the first operating voltage. The two multivibrators then work like change-over switches which, in each case, connect the non-common pole (−V, +V) of their sources of operating voltage to one terminal of the heating resistor $R_H$ through the series resistors $R_1$, $R_2$, while the other terminal of the heating resistor is connected to the common pole (0) of the two operating voltages.

Figure 4:
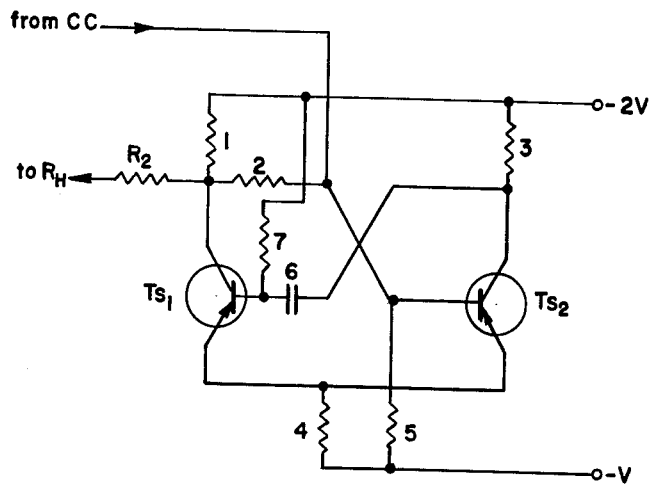
FIGURES 4 and 5 are simplified diagrams of the time controlled switches $M_2$ and $M_1$, respectively, of FIGURE 3.

FIGURE 4 the monostable multivibrator $M_2$ consists in two transistors of the same PNP-type $Ts_1$ and $Ts_2$, resistors 1, 2, 3, 4, 5 and 7 and a capacitance 6. The multivibrator is actuated at the base-terminal of transistor $Ts_2$ by negative pulses of the control circuit CC and gives a current pulse from the collector-terminal of the transistor $Ts_1$ to the resistor $R_H$.

Figure 5:
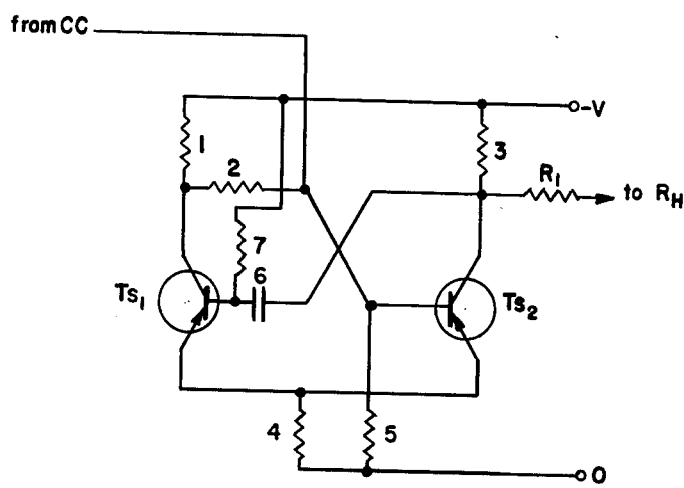

In FIGURE 5 is shown the same circuit as in FIGURE 4 with the only difference, that the current pulse is taken from the collector terminal of the transistor $Ts_2$.

It will be understood that the description of the present invention is susceptible to various modifications, changes, and adaptations, and the same are intended to be comprehended within the meaning and range of equivalents of the appended claims.

What is claimed is:

1. In a circuit arrangement for reducing the time constant of indirectly heated temperature-responsive resistors, the heating current of which is regulated in step-wise manner by means of an electronic digital setting device, for use in connection with the level control in multi-channel carrier-frequency communication systems, the improvement comprising two time-controlled switches, said setting device including a control circuit for actuating said switches simultaneously with the setting device, in such a manner, that upon a step-wise increase in the heating current, one switch causes a substantial additional increase in the heating current for a short time and that, upon a step-wise reduction in the heating current, the other switch causes a substantial additional reduction in the heating current for a short time.

2. A circuit arrangement for reducing the time constant of temperature-responsive resistors, comprising in combination:
 (a) a current regulating device for providing a step-wise change in the heating current for an indirectly heated temperature-responsive resistor;
 (b) a pair of switch means, one for providing, upon actuation, an increase in the heating current for such resistor which increase is substantial in relation to the step-wise increase provided by said current regulating device, and the other for providing, upon actuation, a decrease in the heating current for such resistor which decrease is substantial in relation to the step-wise decrease provided by said current regulating device; and
 (c) a control circuit connecting said switch means and said current regulating device for actuating said one switch means for providing an increase in the heating current for a short period of time when the current regulating device provides a step-wise increase in heating current, and for actuating said other switch means for providing a decrease in the heating current for a short period of time when the current regulating device provides a step-wise decrease in heating current.

3. An arrangement as defined in claim 2 wherein said switch means are monostable multivibrators.

4. A circuit arrangement for reducing the time constant of temperature-responsive resistors, comprising, in combination: a current regulating device for providing a step-wise change in the heating current of a temperature-responsive resistor; a pair of switch means in the form of monostable multivibrators, one for providing, upon actuation, an increase in the heating current of such resistor which increase is substantial in relation to the step-wise increase provided by said current regulating device, and the other for providing, upon actuation, a decrease in the heating current of such resistor which decrease is substantial in relation to the step-wise decrease provided by said current regulating device; a control circuit connecting said switch means and said current regulating device for actuating said one switch means for providing an increase in the heating current for a short period of time when the current regulating device provides a step-wise increase in heating current, and for actuating said other switch means for providing a decrease in the heating current for a short period of time when the current regulating device provides a step-wise decrease in heating current; a plurality of operating voltage means; series resistors; and a heating resistor having two terminals, the multivibrator for providing positive current pulses being connected to one operating voltage means, and said current regulating device being arranged to have the same operating voltage, the multivibrator for negative current pulses being connected to another of said operating voltage means which is connected in series with said one operating voltage means so that the two multivibrators act like change-over switches which connect the non-common pole of their operating voltage means with one terminal of said heating resistor via said series resistors, the other terminal of said heating resistor being connected to the common pole of said operating voltage means.

5. An arrangement as defined in claim 4 wherein said multivibrators include transistors having the same type conductivity, said one operating voltage means providing a voltage of $-V$, 0 and said other operating voltage means providing a voltage of $-2V$, $-V$.

6. An arrangement as defined in claim 4 wherein said multivibrators include NPN and PNP transistors, said one operating voltage means providing a voltage of $-V$, 0 and said other operating voltage means providing a voltage of 0, $+V$.

7. A circuit arrangement for reducing the time constant of temperature-responsive resistors, comprising, in combination:
(a) a setting device for providing a step-wise change in the heating current of a temperature-responsive resistor;
(b) switch means for providing a change in the heating current of such resistor upon actuation thereof which change is substantial in relation to the step-wise change provided by said setting means; and
(c) a control circuit connecting said switch means with said setting device for actuating said switch means for providing a substantial change in the heating current for a short period of time when the setting device provides a step-wise change in heating current.

8. A circuit arrangement for reducing the time constant of temperature-responsive resistors, comprising, in combination:
(a) a pair of time controlled switch means, one for providing a substantial increase in the heating current of a temperature-responsive resistor upon actuation thereof, and the other for providing a substantial decrease in the heating current;
(b) a setting device for providing relatively small stepwise changes in the heating current; and
(c) a control circuit connecting said switch means with said setting device for actuating said one switch means for providing an increase in the heating current for a short period of time when the setting device provides a step-wise increase in the heating current and for actuating said other switch means for providing a decrease in the heating current for a short period of time when the setting device provides step-wise decrease in the heating current.

References Cited by the Examiner

UNITED STATES PATENTS

| | | | |
|---|---|---|---|
| 2,545,353 | 3/51 | Gund | 236—78 |
| 2,806,200 | 9/57 | Ketchledge | 178—70 |
| 2,867,774 | 1/59 | Bell | 333—16 |
| 2,984,729 | 5/61 | Hykes et al. | 331—113 X |
| 3,040,157 | 6/62 | Hukee | 219—498 |
| 3,074,020 | 1/63 | Ropiequet | 331—145 |

RICHARD M. WOOD, *Primary Examiner.*